(12) United States Patent
Kepler et al.

(10) Patent No.: US 10,079,413 B2
(45) Date of Patent: Sep. 18, 2018

(54) LI-ION POUCH CELL AND A CELL MODULE

(71) Applicant: Farasis Energy, Inc., Hayward, CA (US)

(72) Inventors: Keith D. Kepler, Belmont, CA (US); Robbert Vermeulen, Pleasant Hill, CA (US); Phillip Hailey, Oakland, CA (US); Andrew Larson, Livermore, CA (US)

(73) Assignee: Farasis Energy, Inc., Hayward, CA (US)

( * ) Notice: Subject to any disclaimer, the term of this patent is extended or adjusted under 35 U.S.C. 154(b) by 332 days.

(21) Appl. No.: 14/164,106

(22) Filed: Jan. 24, 2014

(65) Prior Publication Data

US 2014/0205882 A1 Jul. 24, 2014

Related U.S. Application Data

(60) Provisional application No. 61/756,410, filed on Jan. 24, 2013, provisional application No. 61/806,039, filed on Mar. 28, 2013.

(51) Int. Cl.
*H01M 10/60* (2014.01)
*H01M 10/658* (2014.01)
(Continued)

(52) U.S. Cl.
CPC ....... *H01M 10/658* (2015.04); *H01M 10/613* (2015.04); *H01M 10/647* (2015.04);
(Continued)

(58) Field of Classification Search
CPC ............. H01M 10/052; H01M 10/058; H01M 10/647; H01M 10/654; H01M 10/613;
(Continued)

(56) References Cited

U.S. PATENT DOCUMENTS 5,478,667 A * 12/1995 Shackle .................. H01M 4/70
429/120
2010/0136411 A1 * 6/2010 Yoon ....................... H01M 4/13
429/144

(Continued)

*Primary Examiner* — Jonathan G Jelsma
*Assistant Examiner* — Omar M Kekia
(74) *Attorney, Agent, or Firm* — Womble Bond Dickinson (US) LLP

(57) ABSTRACT

The present invention provides a Li-ion pouch cell wherein the Li-ion pouch cells comprise a sealed enclosure, electrode stack and thermally conductive elements, wherein the electrode stack and the thermally conductive elements are in the sealed enclosure, the thermally conductive elements include extensions which extend beyond the electrode stack, the sealed enclosure has thermal conductivity, the thermally conductive elements provide a thermally conductive pathway connecting the electrode stack and the sealed enclosure by way of the extension. The present invention also provides a cell module comprising the Li-ion pouch cells. The Li-ion pouch cell and the cell module according to the present application could minimize differences in cell temperature, monitor internal cell temperature, cool the cell rapidly, increase cell and module safety, allowing for minimal impact on cell energy density, performance or life and difficulty of manufacturing.

11 Claims, 7 Drawing Sheets

(51) Int. Cl.
*H01M 10/647* (2014.01)
*H01M 10/654* (2014.01)
*H01M 10/613* (2014.01)
H01M 10/052 (2010.01)
H01M 10/058 (2010.01)
H01M 10/655 (2014.01)

(52) U.S. Cl.
CPC ........ *H01M 10/654* (2015.04); *H01M 10/052* (2013.01); *H01M 10/058* (2013.01); *H01M 10/655* (2015.04); *Y02E 60/122* (2013.01); *Y02P 70/54* (2015.11)

(58) Field of Classification Search
CPC . H01M 10/658; H01M 10/655; Y02E 60/122; Y02P 70/54
USPC ......................................................... 429/120
See application file for complete search history.

(56) References Cited

U.S. PATENT DOCUMENTS

| 2011/0059347 A1* | 3/2011 | Lee ......................... B60L 11/18 |
| --- | --- | --- |
| | | 429/120 |
| 2011/0305932 A1* | 12/2011 | Doshi ................. H01M 6/5038 |
| | | 429/94 |
| 2012/0231313 A1* | 9/2012 | Kumar .............. H01M 10/5032 |
| | | 429/120 |
| 2013/0330585 A1* | 12/2013 | Utterman ............ H01M 2/0207 |
| | | 429/94 |

* cited by examiner

A)

Standard

B)

Modified

A)

Standard

B)

Modified

A)

B)

LI-ION POUCH CELL AND A CELL MODULE

CROSS-REFERENCE TO RELATED APPLICATIONS

The present application claims the benefit of the U.S. provisional patent application No. 61/756,410, filed on Jan. 24, 2013 and U.S. provisional patent application No. 61/806,039, filed Mar. 28, 2013, and the contents of both provisional patent applications are incorporated by reference.

GOVERNMENT LICENSE RIGHTS

This invention was made in part with government support under support of the United States Government Department of Energy, ARPA-E grant number DE-AR0000270. The U.S. Government has certain rights in the invention.

FIELD OF THE INVENTION

The invention relates to a Li-ion pouch cell, and a cell module which comprises the Li-ion pouch cells.

BACKGROUND OF THE INVENTION

Li-ion pouch cells provide very high energy density but can suffer from degradation due to excessive or non-uniform heating of the electrode stack, particularly for thicker cells. For example, very thick cells when discharged at high rate will reach a much higher temperature in the center of the cell relative to the outer layers of the cell. Also in a rapid thermal event, it is often very difficult to remove the heat quickly enough to prevent thermal runaway and related safety issues. Typically cells are cooled by using thermally conductive plates, such as Aluminum plates, placed in contact against one or both of the flat faces of the Li-ion pouch cell. It is also known that cells can be partially cooled or heated using the tabs that exit the pouch cell and carry the electrical current during charge and discharge since thermal conduction parallel to the face of the cell along the metal current collectors to the tabs is much greater than thermal conduction from the center of the cell to the face through the many electrode and separator layer interfaces. However, it is desirable to separate thermal and electrical pathways to enable independent optimization of the system design relative to these parameters. Also cells with lower impedance are less likely to heat up.

However, these solutions to addressing thermal management and control in Li-ion battery applications can lead to a major decrease in the cell energy density because of the extra volume and weight of the tabs or cooling plates or the increase in the number of thinner, lower capacity or lower impedance cells required to meet the energy demands of an application. These solutions can also lead to additional cost of the overall battery system. It is also well known that it is difficult and expensive to increase the size or number of tabs or other thermally conductive elements passing through the Aluminum laminate packaging seal due to manufacturing complications and the increasing likelihood of leaks forming around the area where the tab passes through the seal. The cells become more susceptible to failure as the number and size of elements, such as tabs, passing through the pouch cell seal is increased. A solution for increasing thermal access to the inside of pouch cells for cooling or heating while minimizing the impact on cell energy density, performance or life is needed.

SUMMARY OF THE INVENTION

To solve this problem, the present invention provides a Li-ion pouch cell which can allow increased thermal control and management, such as heating and cooling, or maintaining more uniform temperatures within the cell by enabling thermal access to the cell from the cell edges or sides without requiring additional thermally conductive elements passing through the pouch cell seal. The cell of this invention can enable improved cooling or heating of the cell from the sides of the cell in addition or in place of cooling or heating from the face of the pouch cell. The cell of this invention may provide benefits of increased energy density, performance and life at lower cost through effective thermal management relative to existing Li-ion pouch cells. The invention also provides a cell module which comprises the Li-ion pouch cells.

Typically, a Li-ion pouch cell comprises a stack of individual anode and cathode electrodes, each pair separated by a non-conductive, porous separator or a single anode electrode and single cathode electrode separated by separator and wound together to form a jelly-roll, or some combination of the two. Herein all variations are referred to as the electrode stack. Tabs for electrical contact are attached to the anode and cathode electrodes in the electrode stack. The electrode stack is sealed within an enclosure with electrolyte with the tabs extending through the enclosure seal to the outside of the cell to enable charging and discharging of the cell.

Generally, the sealed enclosure of Li-ion pouch cells is an Al-laminate pouch formed from a thin sheet or sheets of Aluminum film coated with adhesive and protective polymer layers. A sealed pouch can be formed with the Al-laminate sheet material using conventional heat and pressure sealing processes. The inventors have unexpectedly observed that the thermal conduction from one face of an Al-laminate sheet used in making a Li-ion pouch cell to the other face is very high. In this example it is believed this is because the protective and adhesive polymer layers coating the Aluminum layer are very thin and Aluminum is highly thermally conductive.

In the cell of this invention, a thermally conductive element or elements are contained within the sealed enclosure of the Li-ion pouch cell to provide a thermally conductive connection between the cell electrode stack and the inside of the sealed pouch cell enclosure. An external thermally conductive element in thermal contact with the outside of the pouch cell allows for internal control of the Li-ion cell temperature from the outside of the cell without the need for the internal thermally conductive element to pass through the pouch cell seal. The internal thermally conductive element enables the formation of a thermally conductive path between the electrode stack and the outside of the cell through the point of contact of the thermally conductive element with the enclosure and an external thermally controlled element.

Therefore, in the first aspect of this invention, the present application provides a Li-ion pouch cell wherein the Li-ion pouch cell comprises a sealed enclosure, electrode stack and thermally conductive elements, wherein the electrode stack and the thermally conductive elements are within the sealed enclosure, the thermally conductive elements include extensions which extend beyond the electrode stack, the sealed enclosure has thermal conductivity, the thermally conductive elements provide a thermally conductive pathway connecting the electrode stack and the sealed enclosure by way of the extension.

Preferably, the extensions are not on the sides of the cell with the electrical tabs.

Preferably, the internal thermally conductive element extensions enable the formation of a thermally conductive path between the electrode stack and an external thermally controlled element through the cell enclosure where the external thermally controlled element compresses the cell enclosure at the sides of the cell.

Preferably, one or more of electrode(s) within the electrode stack extend beyond the electrode stack to form the thermally conductive element(s), more preferably, the extension of the one or more electrodes within the electrode stack to form the thermally conductive element comprises bare metal foil.

Preferably, the extensions extend beyond the electrode stack by 1-20 mm.

Preferably, the material of the thermally conductive elements comprises Al and/or Cu.

In the second aspect of this invention, the present application provides a cell module comprising one or more of the Li-ion pouch cell as the above and a cell frame incorporating a thermally controlled element that compresses the thermally conductive extensions through the sealed enclosure at the edges of the cell to form a thermally conductive path between the electrode stack and the thermally controlled element external to the cell.

The Li-ion pouch cell and the cell module according to the present application could increase the capability to thermally control the pouch cell temperature, minimize differences in cell temperature, monitor internal cell temperature, cool the cell rapidly, and increase cell and module safety by providing a thermally conductive pathway from the internal electrode stack to the outside of the pouch cell by way of thermally conductive extensions, extending beyond the electrode stack and contained fully within the sealed pouch cell. The invention could enable improved cell and module thermal management without the need for additional elements to pass through the pouch cell seal, allowing for minimal impact on cell energy density, performance or life and difficulty of manufacturing. The Li-ion pouch cell and the cell module according to the present application could provide greater thermal control and safety and could be widely used in battery production.

Other features and advantages of the present invention will be explained specifically in the following detailed description of the embodiments.

BRIEF DESCRIPTION OF THE REFERENCE SIGNS

Figure 1:
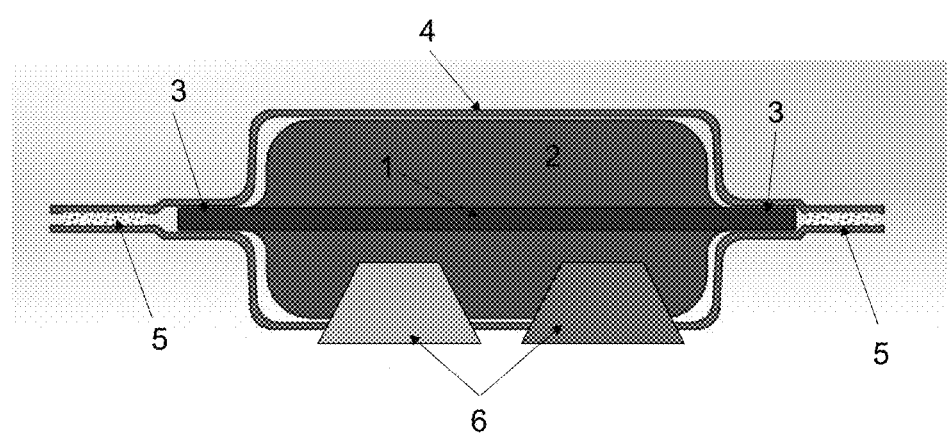
FIG. 1 shows a side cross-sectional view illustration of the Li-ion Pouch cell of this invention.
Figure 2A:
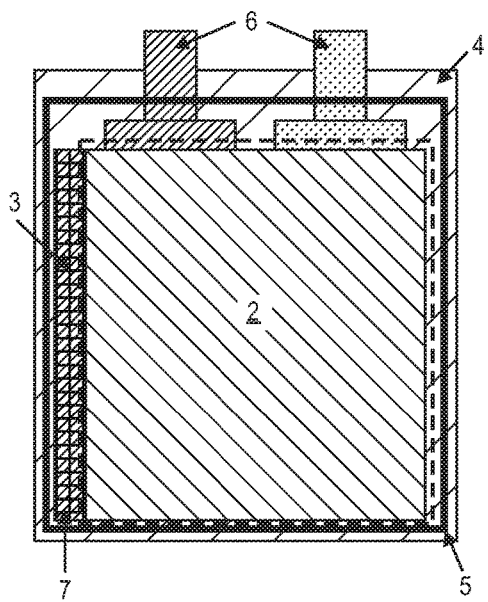
FIG. 2 shows a top view illustration of the Li-ion pouch cell of this invention with other possible configuration examples.
Figure 2B:
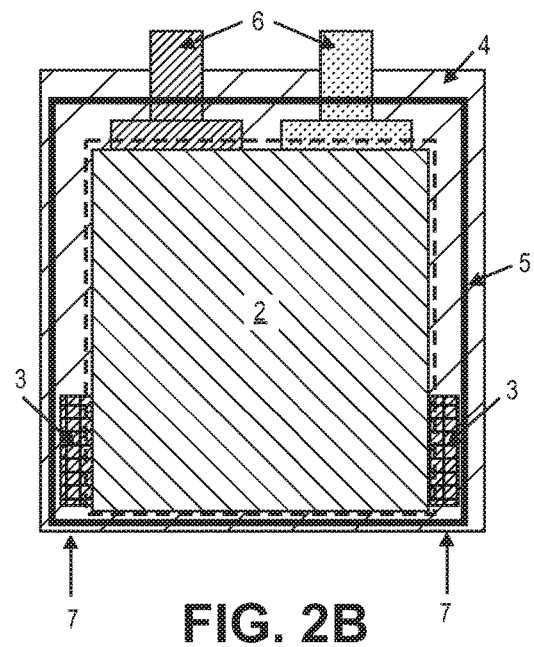
Figure 2C:
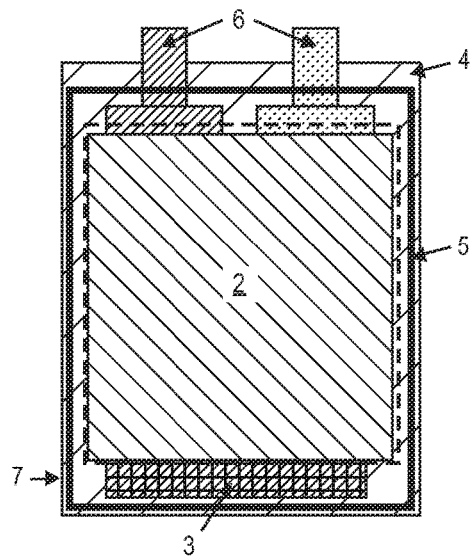
Figure 2D:
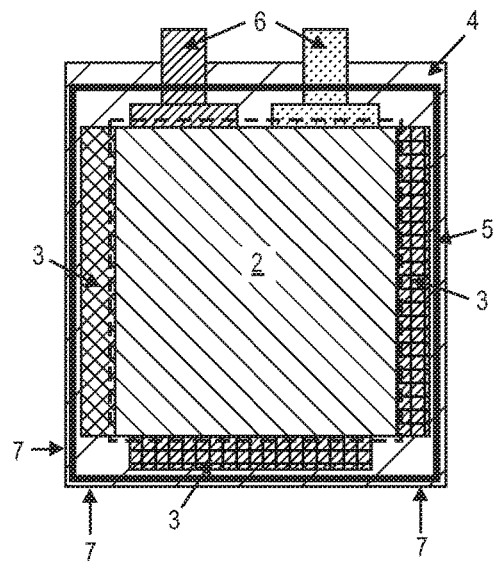

1 electrode; 2 electrode stack; 3 thermally conductive element; 4 sealed enclosure; 5 seal area; 6 tab; 7 pinch area; 8 thermal sink; 9 frame.

DETAILED DESCRIPTION OF THE EMBODIMENTS

Hereunder the embodiments of the present invention will be specified in details. It should be appreciated that the embodiments described here are only provided to describe and explain the present invention, but shall not be deemed as constituting any limitation to the present invention.

In the first aspect of this invention, the present invention provides a Li-ion pouch cell wherein the Li-ion pouch cell comprises a sealed enclosure 4, electrode stack 2 and thermally conductive element(s) 3, wherein the electrode stack 2 and the thermally conductive elements 3 are contained within the sealed enclosure 4, the thermally conductive elements 3 include one or more thermally conductive extension(s) which extend beyond the electrode stack 2, the sealed enclosure 4 has thermal conductivity, the thermally conductive elements 3 provide a thermally conductive path between the electrode stack 2 and the sealed enclosure 4 by way of the extension.

The present invention is to provide enhanced thermal control of a Li-ion pouch cell by configuring the thermally conductive element(s) 3 therein. Therefore, the invention does not put forward specific requirements on other components of the Li-ion pouch cells, the components may be conventional arrangements of the Li-ion pouch cells which are commonly used in the field. As a result, the skilled person in the art shall understand that the electrode stack 2 is formed by non-electrically conductive connection and lamination of at least one cathode electrode and at least one anode electrode.

The present invention does not present specific requirements on the size and shape of the thermally conductive elements 3, only if the thermally conductive elements 3 include extensions which extend beyond the electrode stack 2. With respect to the material of the thermally conductive elements 3, the present invention merely requires the material possesses thermal conductivity. In order to allow the thermally conductive elements 3 to perform their thermal conductivity in a better fashion, the material of the thermally conductive elements 3 preferably comprise aluminum (Al) and/or copper (Cu).

Thermally conductive elements 3 may be formed in various ways such that the elements connect the electrode stack 2 and the sealed enclosure 4 in a thermally conductive manner during cell operation via the extensions. For example, the elements may be sheet-shape structures formed from thermally conductive materials, the sheet-shaped structure has thermally conductive contacts with an electrode 1 or electrodes 1 in the electrode stack 2, and comprises extension(s) which extend beyond the electrode stack 2. The extensions enable contact with the sealed enclosure 4 in a thermally conductive manner during cell operation. In another embodiment of the invention, one or more of the electrode 1 layers within the electrode stack 2 are attached with thermally conductive material on the sides of the electrode 1 layers and the attached electrode 1 layers extend beyond the electrode stack 2 to form the thermally conductive elements 3; In another embodiment of the invention, the thermally conductive elements 3 are formed by means of extending one or more of the cell electrodes 1 within the electrode stack 2 beyond the stack. Preferably the extensions of the electrodes 1 are the electrode current collector foils, preferably bare foil, not coated with electrode active material. In order to facilitate arrangement and avoid supplementing redundant parts, preferably, the thermally conductive elements 3 are formed by means such that one or more electrodes 1 in the electrode stack 2 extend beyond the stack.

FIG. 1 provides a cross sectional illustration of one embodiment of the cell of this invention. As illustrated in FIG. 1, one electrode 1 in the electrode stack 2 extends beyond the electrode stack 2 to form said thermally conductive element(s) 3. The skilled person in the art shall understand that the extensions are a portion of the thermally conductive elements 3, and the extensions are also contained in the sealed enclosure 4. In the illustration of FIG. 1 the cell enclosure is created by forming seals area 5 around the perimeter of the Al-laminate pouch (4) with only the positive and negative tabs 6 passing through the seal to the outside of the pouch. As generally known among one skilled in the art that the Li-ion pouch cells comprise tabs 6, the thermally conductive elements 3 and the electrode stack 2 are completely contained in the sealed enclosure 4, except that the tabs 6 traverse the sealed enclosure 4.

According to the specific requirements for the thermal control of the cells, the present invention may comprise one or more electrodes 1 that extend beyond the electrode stack 2 and form the thermally conductive elements 3, the extended electrode(s) 1 may be a cathode electrode(s) or an anode electrode(s), or both a cathode electrode(s) and an anode electrode(s). In a preferred embodiment the number of extensions is some portion of the total number of electrodes 1 in the electrode stack 2. For example 1 of every 10 electrodes 1 would comprise a thermal extension or 10% of the electrodes 1. Furthermore, it may be desirable to distribute the electrodes 1 with thermal extensions across the entirety of the electrode stack 2. For example, in a 40 electrode stack 2, electrodes 1 with extensions may comprise every $5^{th}$ electrode 1 in the stack. In another embodiment, all the electrodes 1 with extensions are placed in the same region, for example the center, of the electrode stack 2. The distribution of the thermally conductive elements 3 of this invention in the electrode stack 2 may be selected to maximize cell thermal control and ease of manufacture depending on the demands of the application.

A skilled person in the art shall understand that the thermally conductive pathway and the electrically conductive pathway of the Li-ion pouch cell in the present invention are independent of each other, that is, the thermally conductive pathway of the Li-ion pouch cell in the present invention does not affect the connection relation of the cathode electrode and anode electrode in the electrically conductive pathway. Under a preferable circumstance the thermally conductive elements 3 are formed by means that one or more electrodes 1 in the electrode stack 2 extend beyond the electrode stack 2, the thermally conductive pathway and the electrically conductive pathway of the Li-ion pouch cell are independent of each other. With respect to the specific method for ensuring that the extensions of a cathode electrode do not touch an anode electrode and the extensions of an anode electrode do not touch a cathode electrode, it may be applied in a conventional method that the cathode electrode and the anode electrode in said Li-ion pouch cell are for example arranged such that they are offset from each other by a minimum amount, have separator positioned such that the electrodes 1 are not in electrical contact or some other conventional means known to those skilled in the art of cell design.

The present invention does not present specific requirements in the position (i.e., the orientation of extensions) or number of the extension(s), the extensions 3 may extend in any direction along the periphery of the electrode stack 2 and in more than one direction. In addition, the invention does not impose specific requirements on the size or thickness of said extensions, the size may be set according to specific requirements for thermal control of the cells or by limitations on cell size. FIG. 2 illustrates different possible configurations of an electrode stack 2 comprising one or more electrodes 1 with thermal extensions. A cell of this invention may incorporate one or more of these possible thermal extension orientations and designs. FIG. 2 A) illustrates that the extensions 3 are located along the entire length of one side of the electrode stack 2. FIG. 2 B) shows that the extensions 3 are positioned in a portion of two sides of the electrode stack 2. FIG. 2 C) shows that the extensions 3 are located in the side opposite to the tabs 6 of the electrode stack 2. FIG. 2 D) shows that the extensions 3 are located along the full length of both sides of the electrode stack 2 and along the base of the electrode stack 2 opposite the tabs 6. The extensions 3 may also be located on the side where the tabs 6 are, though separate from the actual area of the tabs 6. In addition, a skilled person shall understand that the tabs 6 in the Li-ion pouch cell may play a role in transferring heat, therefore, the extensions preferably comprise the part extending beyond said electrode stack 2 along an opposite direction of the tabs 6, so as to balance the cooling effect of the tabs 6, that is, if the side in which tabs 6 are arranged is called the upper end, the extensions preferably contain the part extending beyond said electrode stack 2 toward the bottom end of the Li-ion pouch cell, as illustrated in FIG. 2 D).

Figure 3:
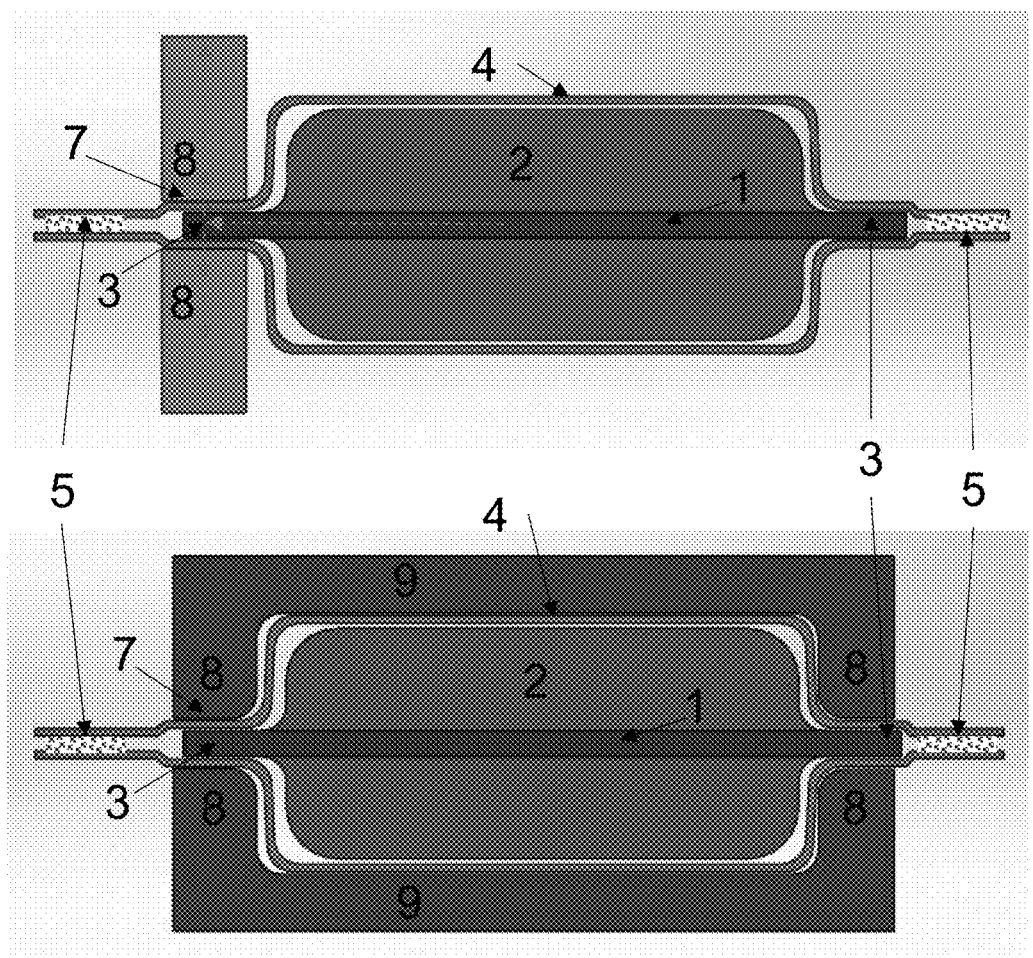
FIG. 3 shows a schematic drawing of the thermal pathway and the cell module.

The present invention does not impose specific requirements on the thermally conductive connection manner of extension(s) and the sealed enclosure 4. as illustrated in FIG. 2 and FIG. 3, in order to obtain a more favorable effect of thermal control, the entire extension(s) (3) are preferably pinched through the sealed enclosure 4 from outside of the Li-ion pouch cell (the "pinch area 7"), such that the extensions are connected with the sealed enclosure 4 in a thermally conductive manner.

As in the present invention, when the Li-ion pouch cell comprises thermally conductive elements 3 formed by extending more than one electrode 1 of the same type, it does not require that all the extensions are welded together and attached to a tab 6, that is, multiple extensions in an electrode stack 2 producing multiple extension layers may maintain a loose state of existence in the sealed enclosure 4. It shall be further understood by the skilled person in the art that the extensions may be folded according to a standard and conventional method of folding electrode 1 layers in the Li-ion pouch cells so as to reduce extra volume. Under a preferable circumstance that the entire extension(s) are compressed or pinched through the sealed enclosure 4 from the outside of the Li-ion pouch cell such that the extensions are connected with the sealed enclosure 4 in a thermally conductive manner, the extensions having a plurality of layers are compressed tightly.

The present invention does not put forward specific requirements on the length that the extensions extend beyond the electrode stack 2. A skilled person shall understand that the length refers to a vertical distance from the edge of extensions to the edge of the electrode stack 2. These extension(s) preferably extend beyond the electrode stack 2 by 1-20 mm, so as to facilitate arrangement and reach a favorable effect of thermal control.

The present invention does not impose specific requirements on the sealed enclosure 4, for example, the enclosure may be an aluminum (Al) laminate pouch which is commonly used in the art, the basic structure of the Al laminate pouch pertains to common knowledge in the art, as illustrated in FIG. 2, the Al laminate pouch comprises a cup area containing the electrode stack 2 and an external seal area 5. As in the present invention, the thermally conductive elements 3 and the electrode stack 2 are completely contained within the sealed enclosure 4, except for the tabs 6 that exit the sealed enclosure 4.

In the second aspect of this invention, the present application provides a structure and method of cooling a Li-ion pouch cell, the structure and method comprising:
(1) providing the Li-ion pouch cell as the above;
(2) using thermal sink(s) 8 to connect the sealed enclosure 4 by the way of thermal conduction from the outside of the Li-ion pouch cell.

The cooling structure and method is illustrated in FIG. 3. Preferably, in step (2), extensions (3) are compressed or pinched through the sealed enclosure 4 from outside of the Li-ion pouch cell to form a "pinch area 7"; in order to make full use of the extensions and to achieve a better thermal control effect, more preferably, the entire part(s) of the extension(s) are pinched and the thermal sink 8 is used to connect the sealed enclosure 4 by way of thermal conduction at the point of pinching, as shown in FIG. 3.

In the present invention, the thermal sink 8 can be connected to the sealed enclosure 4 by way of thermal conduction through thermally conductive material, wherein the thermally conductive material, as long as it has thermal conductivity, is not restricted in particular, and the thermally conductive material may be, for example, a metal bar, thermally conductive polymers and etc., i.e., using thermally conductive material to pinch extensions through sealed enclosure 4, then connecting thermally conductive material to the thermal sink 8 in the way of thermal conduction.

In the present invention, the thermal sink 8 is not restricted in particular and any kind of common thermal sinks 8 in the art can be used; in a sense, the above thermally conductive materials can be used as a thermal sink 8, as shown in FIG. 3. These thermally conductive materials can also be hollow, and contain a flowing coolant to remove heat.

In the third aspect of this invention, the present application provides a cell module wherein the cell module comprises a frame 9 and one or more of the Li-ion pouch cells as the above, wherein the frame 9 supports the Li-ion pouch cells from outside of the Li-ion pouch cells as illustrated in FIG. 3B).

In the present invention, the way in which the frame 9 supports the Li-ion pouch cell is not restricted in particular and may be any way commonly used in the art, for example, the frame 9 can hold the pouch cell by clamping or pinching, in the cell at the entire periphery of the edge of the cell, or at some points of the edge and/or face of the cell.

In the present invention, preferably, extension(s) are pinched through a sealed enclosure 4 by the frame 9; in order to make full use of the extensions and to achieve a better thermal control, more preferably, the entire part(s) of the extension(s) are pinched, the frame 9 preferably includes a thermal sink 8 which is connected to the sealed enclosure 4 in the way of thermal conduction at the point of pinching.

As described above, the thermal sink 8 can be connected to sealed enclosure 4 in the way of thermal conduction through thermally conductive material, wherein the thermally conductive material, as long as it has thermal conductivity, is not restricted in particular, and the thermally conductive material may be, for example, a metal bars, thermally conductive polymers and etc., i.e., using thermally conductive material to pinch extensions through sealed enclosure 4, then connecting thermally conductive material to the thermal sink 8 in the way of thermal conduction. The thermal sink 8 is not restricted in particular and any kind of common thermal sink 8 in the art can be used; in a sense, the above thermally conductive material can be used as a thermal sink 8, as shown in FIG. 3.

In the present invention, thermally conductive material pinches the extensions through the sealed enclosure 4 to form heat conduction path in which the heat of the electrode 1 is transferred to the thermally conductive material through the extensions and the sealed enclosure 4, as shown in FIG. 3.

In the present invention, when the Li-ion pouch cell comprises thermally conductive element(s) 3 formed by extending more than one electrode 1 with same type, it is not required that all the extensions are welded together and attached to a tab 6, i.e., the extensions with a multiple of layers may maintain a loose state of existence in the sealed enclosure 4. It shall be further understood by the skilled person in the art that the extensions may be folded according to a standard and conventional method of folding electrode 1 layers in the Li-ion pouch cells so as to reduce extra volume. In the preferred case when the frame 9 pinches the extensions through the sealed enclosure 5, the extensions having a plurality of layers are compressed tightly.

EXAMPLES

Hereinafter, the Li-ion pouch cell of the present invention will be described with reference to the examples, which are given only for better understandings of the present invention and intended not to limit the scope of the present invention.

Figure 4:
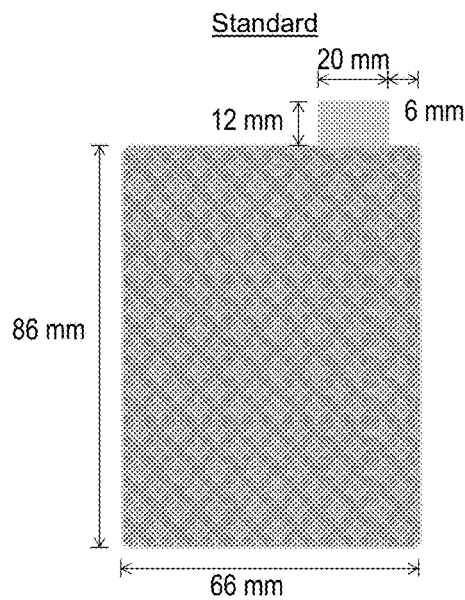
FIG. 4 shows a schematic drawing of cathode electrodes and cathode electrodes with thermal extensions
Figure 4:
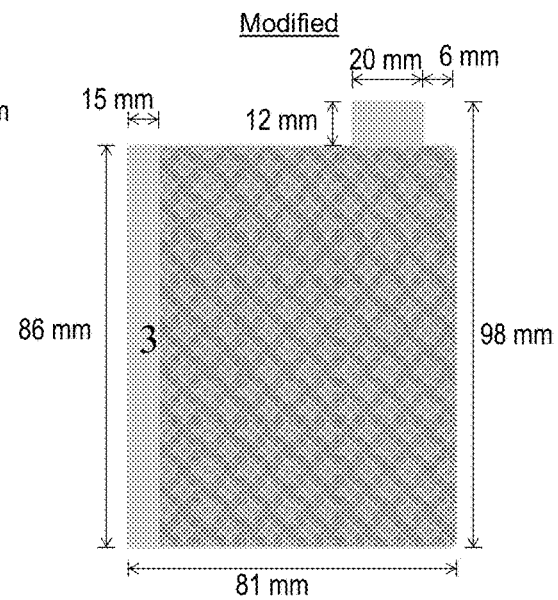
Figure 5:
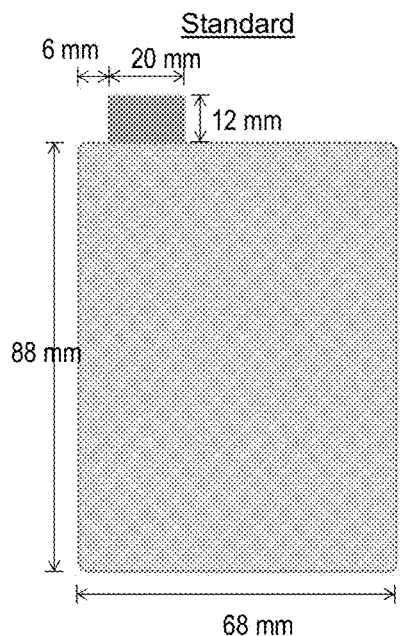
FIG. 5 shows a schematic drawing of anode electrodes and anode electrodes with thermal extensions
Figure 5:
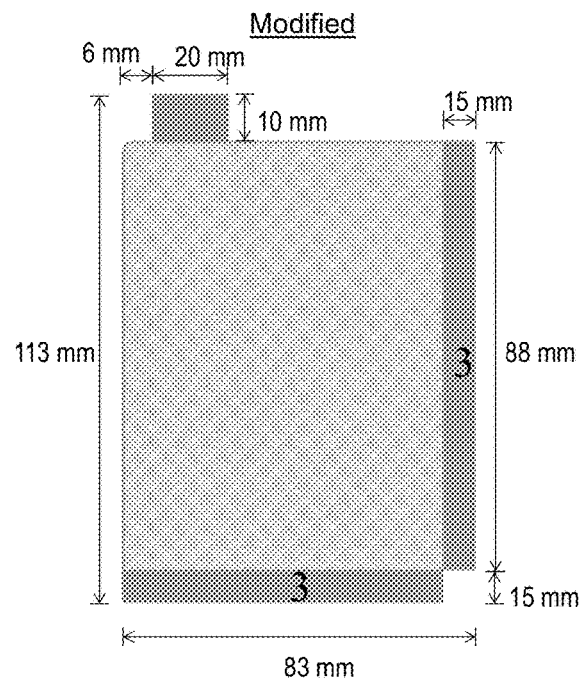

Example 1: Construction and Performance of a 10 Ah Li-Ion Pouch Cell with Internal Thermally Conductive Extensions In this example a Li-ion pouch cell of this invention was built. The cathode electrodes were prepared by conventional methods using conventional Li-ion battery materials. The cathode current collector was Al-foil which was coated with a laminate slurry of $Li(NiCoMn)O_2$ or NCM(111) active material, carbon based conductive additive and PVDF binder. Once dry the cathode electrodes were calendared. The anode electrodes were prepared by coating a copper foil current collector with a laminate slurry of graphitic carbon and PVDF binder. Once dry the anode electrodes were calendared. FIGS. 4A) and 5A) show illustrations of the standard cathode and anode electrodes respectively when prepped for cell assembly. The bare foil region at the top of the electrode 1 was used to connect the electrodes 1 to the electrical tabs 6. FIGS. 4B) and 5B) show cathode and anode electrodes respectively prepared with extensions of bare foil current collector. In the case of the cathode electrode the Al current collector was extended along the length of the left hand side of the electrode 1. The mass free or uncoated extension was approximately 15 mm wide. In the case of the anode electrode the Cu current collector was extended along the length of the right hand side of the electrode 1 and along the base of the electrode 1 (opposite the tab 6 area). The mass free or uncoated extension was approximately 15 mm wide.

Figure 6:
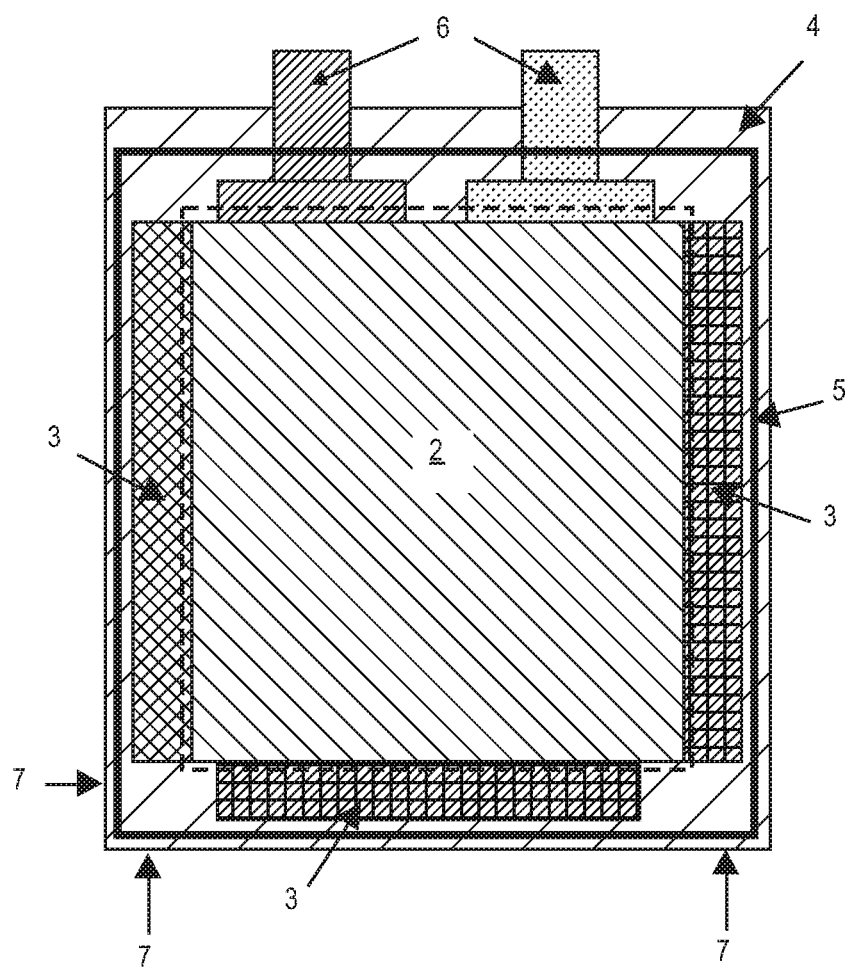
FIG. 6 shows the assembly of a cell of this invention.

The cell was assembled using a Z-fold structure in which anode and cathode electrodes were stacked alternately with a continuous wrap of separator weaved between the electrodes 1 in a "Z" pattern separating each layer. In total 41 anode electrodes and 40 cathode electrodes were used to make the cell. In the cell of this example, four of the 40 cathode electrodes were cathode electrodes with extensions and 5 of the 41 anode electrodes were anode electrodes with extensions. The cathode electrodes with extensions were used for layers 8, 16, 24 and 32, distributed through the stack and the anode electrodes with extensions were used for layers 4, 12, 20, 28 and 36 distributed through the stack. FIG. 6 shows an illustration of the top view of the assembly of this example. In the assembled electrode stack 2 the 5 layers of copper foil anode extensions extend beyond the electrode stack 2 and are collected to the left of the electrode stack 2 relative to the tabs 6. The 4 layers of Al foil cathode extensions extend beyond the electrode stack 2 and are collected to the right of the electrode stack 2 relative to the tabs 6.

Figure 7:
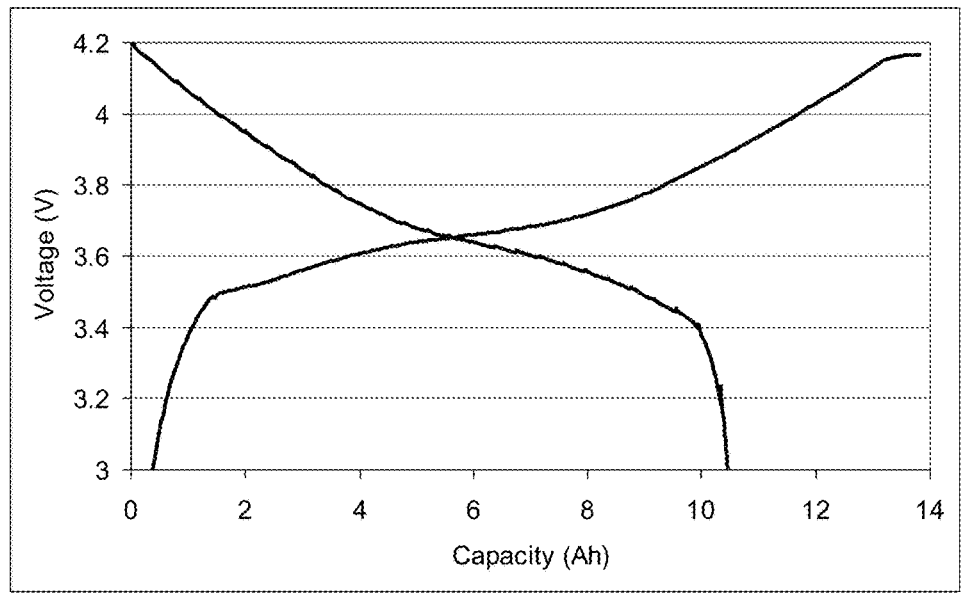
FIG. 7 shows voltage curves and cycling data for a cell of this invention.=
Figure 7:
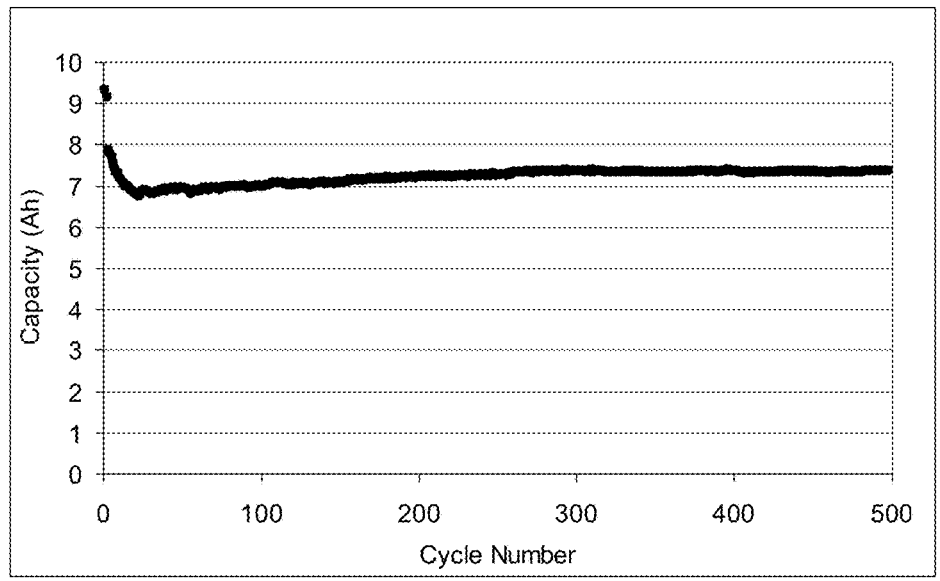

The cell was filled with a conventional Li-ion battery electrolyte comprising an $LiPF_6$ salt and a mixed carbonate solvent and was vacuum sealed in an Aluminum laminate pouch with only the tabs 6 passing through the seal. The extensions were fully contained within the pouch after sealing. The cell was formed and cycled providing the expected capacity (~10 Ah) and cycle life. FIG. 7A) shows the voltage curves for the first charge/discharge cycle. FIG. 7B) shows the cycling performance of the cell at a charge rate of ~1 C (9 A) and a discharge rate of ~5 C (45 A).

Figure 8:
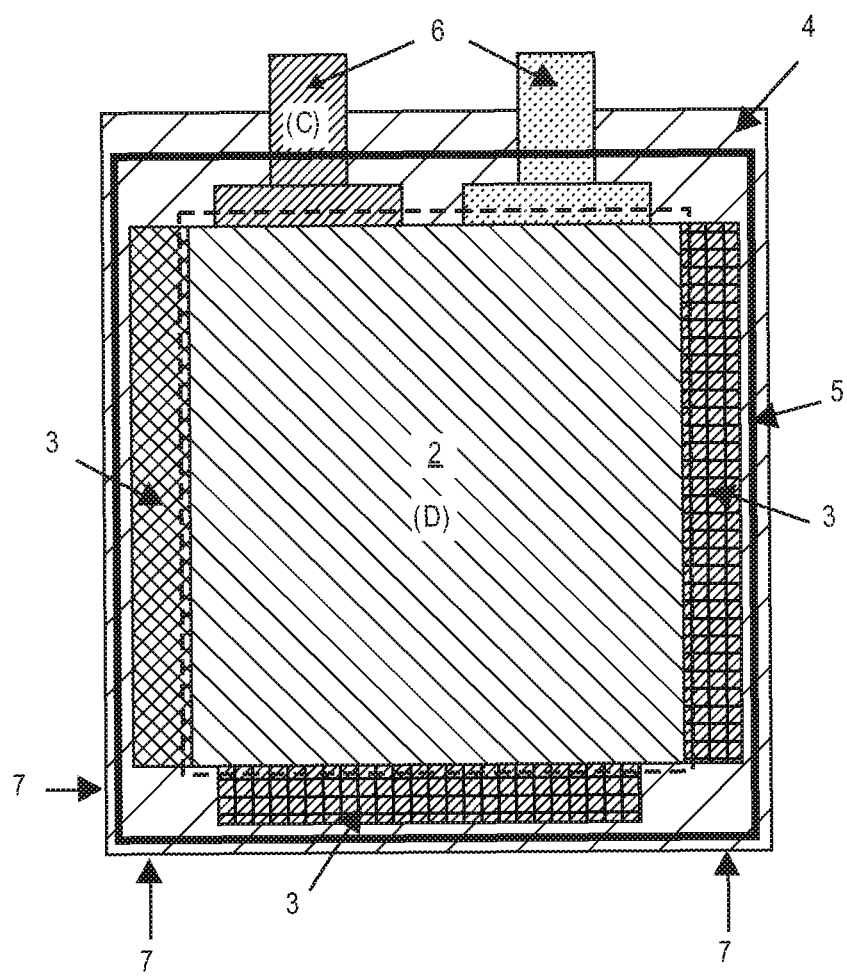
FIG. 8 shows the thermal profile of a cell of this invention.

Example 2: Cooling a 10 Ah Li-ion Pouch Cell with Internal Thermally Conductive Extensions In this example the cell of Example 1 was discharged at a ~2 C rate (20 A) with and without utilizing the thermal extensions to cool the cell while the cell temperature at the face of the cell and at the anode tab 6 of the cell was monitored. Thermocouples were attached to the middle of the face of one side of the cell (D) and to the anode tab (C) of the cell to continuously monitor the cell temperature during cycling. The anode tab temperature provides an indication of the internal temperature of the cell since the anode tab provides a direct thermal connection to the electrode stack 2, and the cell face provides an indication of the overall cell temperature. FIG. 8 A) shows an image of the cell and the location of the thermocouples at the face of the cell (D) and the anode tab of the cell (C).

For the first test the cell was placed on a thermally insulating surface. No external cooling was used to cool the cell during the test. The cell was charged at a ~1 C rate (10 A) and rested at open circuit for 1 hour. The cell was then discharged at a ~2 C rate or 20 A. FIG. 8B) shows a plot of the discharge voltage curve A and the corresponding temperature rise of the cell at the cell face D and anode tab 6 C during the discharge cycle. The peak temperature at the face of the cell was 62° C. and the peak temperature measured at the anode tab 6 was 70° C. This corresponds to a 32° C. increase in cell temperature at the cell face and 40° C. temperature increase at the anode tab 6. The temperature increase is representative of the temperature increase expected if the cell had been built without any electrode 1 extensions.

In the next test, two small ¼ inch thick Al plates were used as heat sinks and were attached only to the bottom edge of the cell by pinching the pouch cell area containing the anode electrode extensions. The plates were held by screws with the pouch cell edge compressed in between the plates. Thus the anode electrode extensions were compressed together at the base of the cell through the Al-laminate packaging in contact with the external thermally controlled element or heat sink. Water from a coolant reservoir (~10 C) was cycled through a bore in only one of the Al-plates, and the flow of water was started 5 minutes prior to cell discharge. The cell was then charged and discharged in the same manner as described for the first test done without any edge cooling. FIG. 8B) shows a plot of the discharge voltage curve B and the corresponding temperature rise of the cell at the cell face F and anode tab 6 E during the discharge cycle. The peak temperature at the face of the cell was 43° C. and the peak temperature measured at the anode tab 6 was 55° C. This corresponds to a 14° C. increase in cell temperature at the cell face and 26° C. temperature increase at the anode tab 6.

A comparison of the temperature increase of the cell during discharge shows that using the anode electrode extensions to cool the cell under the conditions of this test resulted in a temperature increase that was 14° C. less than observed for the control test in which no cooling was used. Similar results would be expected if another edge or all edges of the cell of Example 1 comprising electrode 1 extensions were used to cool the cell.

Comparing the above examples and comparative examples, it can be seen that the Li-ion pouch cell according to the present invention could be cooled rapidly by the thermally conductive elements 3 comprising extensions which extend beyond the electrode stack 2.

The Li-ion pouch cell, the cooling method and the cell module according to the present application could minimize differences in cell temperature, monitor internal cell temperature, cool the cell rapidly, increase cell and module safety by the thermally conductive elements 3 including extensions which extends beyond the electrode stack 2, without the need for adding additional tabs 6 to the cell and allowing for minimal impact on cell energy density, performance or life and difficulty of manufacturing. The Li-ion pouch cell, the cooling method and the cell module according to the present application could provide greater thermal control and safety and could be widely used in battery production.

Although the embodiments of the present invention have been disclosed for illustrative purposes, it will be appreciated that the present invention is not limited thereto, and those skilled in the art will appreciate that various modifications, additions, and substitutions are possible, without departing from the scope and spirit of the invention.

Accordingly, any and all modifications, variations, or equivalent arrangements should be considered to be within the scope of the invention, and the detailed scope of the invention will be disclosed by the accompanying claims.

What is claimed is:

1. A Li-ion pouch cell comprising:
   a pouch;
   a seal area surrounding the pouch, wherein the seal area seals the pouch;
   an electrode stack;
   thermally conductive elements and
   extensions to the thermally conductive elements that extend beyond the electrode stack, wherein the electrode stack, the thermally conductive elements and the extensions to the thermally conductive elements are entirely contained within the pouch without breaching the seal area, wherein the pouch has thermal conductivity, wherein the thermally conductive extensions contact the pouch in a thermally conductive manner to provide a thermally conductive pathway connecting the electrode stack and the pouch, wherein at least one of the thermally conductive elements comprises an electrode portion extending beyond the electrode stack.

2. The cell of claim 1, wherein the thermally conductive elements and the extensions comprise a same material.

3. The cell of claim 1 in which the thermally conductive element extensions enable the formation of a thermally conductive path between the electrode stack and an external thermally controlled element through the pouch, wherein the external thermally controlled element compresses the thermally conductive element extensions contacting the pouch by compressing an outside of the pouch overlapping where the pouch contacts the thermally conductive element extensions at an inside of the pouch.

4. The cell of claim 1 in which each of the thermally conductive elements comprises a bare metal foil component.

5. The cell of claim 1 in which the extensions extend beyond the electrode stack by 1 to 20 millimeters.

6. The cell of claim 1 in which the material of the thermally conductive elements comprises aluminum (Al), copper (Cu) or Al and Cu.

7. A cell module comprising:
a plurality of Li-ion pouch cells, wherein each of the Li-ion pouch cells comprises:
  a pouch,
  a seal area surrounding the pouch, wherein the seal area seals the pouch;
  an electrode stack;
  thermally conductive elements that include
  extensions that extend beyond the electrode stack, wherein the electrode stack and the thermally conductive elements including the extensions are entirely contained within the pouch without breaching the seal area, wherein the pouch has thermal conductivity, wherein the thermally conductive extensions contact the pouch in a thermally conductive manner to provide a thermally conductive pathway connecting the electrode stack and the pouch;
  and a cell frame incorporating a thermally controlled element that compresses the thermally conductive extensions contacting the pouch by compressing the pouch where the pouch contacts the thermally conductive element extensions to form a thermally conductive path between the electrode stack and the thermally controlled element external to the cell, wherein at least one of the thermally conductive elements comprises an electrode extending beyond the electrode stack.

8. The cell module of claim 7, wherein the thermally conductive elements and the extensions comprise a same material.

9. The cell module of claim 7, wherein each of the thermally conductive elements comprises a bare metal foil component.

10. The cell module of claim 7, wherein the extensions extend beyond the electrode stack by 1 to 20 millimeters.

11. The cell module of claim 7, wherein the material of the thermally conductive elements comprises aluminum (Al), copper (Cu), or Al and Cu.

* * * * *